United States Patent [19]

Killerud et al.

[11] Patent Number: 4,971,307

[45] Date of Patent: Nov. 20, 1990

[54] DEVICE FOR JOINING OF PIPELINES

[75] Inventors: Kai Killerud, Hafrsfjord; Arne Vingerhagen, Sandnes; Audun Bratseth, Trondheim, all of Norway

[73] Assignee: Den Norske Stats Oljeselskap a.s., Norway

[21] Appl. No.: 142,350

[22] Filed: Dec. 28, 1987

Related U.S. Application Data

[63] Continuation of Ser. No. 865,058, May 20, 1986, abandoned.

[30] Foreign Application Priority Data

May 31, 1985 [NO] Norway .................................. 852185

[51] Int. Cl.$^5$ ............................................. F16L 41/02
[52] U.S. Cl. ..................................... 285/155; 138/172
[58] Field of Search ....................... 285/155, 152, 177; 4/DIG. 7, 211; 138/172; 165/174

[56] References Cited

U.S. PATENT DOCUMENTS

| | | | |
|---|---|---|---|
| 1,329,285 | 1/1970 | Brownlee | 285/155 |
| 1,378,054 | 3/1921 | Pratt | 285/155 |
| 1,801,091 | 4/1931 | Krauss . | |
| 1,984,242 | 12/1934 | Trainer et al. | 285/155 |
| 2,449,754 | 9/1948 | Seitz | 285/155 |
| 2,479,578 | 8/1949 | Langvand | 285/155 |
| 2,505,303 | 4/1950 | Randa | 285/155 |
| 2,533,720 | 12/1950 | Danel | 285/155 |
| 2,762,635 | 9/1956 | Lorber | 285/155 |
| 3,262,497 | 7/1966 | Worthen | 285/155 |
| 3,319,650 | 5/1967 | Peterson | 285/155 |
| 3,346,887 | 10/1967 | Sommer | 285/155 |
| 3,376,897 | 4/1968 | Dolder | 285/155 |
| 3,508,290 | 4/1970 | Ellis . | |
| 3,690,702 | 9/1972 | Moore . | |
| 3,767,233 | 10/1973 | Hodge | 403/292 |
| 3,791,679 | 2/1974 | Glover | 285/155 |
| 3,951,440 | 4/1976 | Dolder . | |
| 4,053,247 | 10/1977 | Marsh | 285/177 |
| 4,192,658 | 3/1980 | Worrell | 165/174 |
| 4,457,364 | 7/1984 | DiNicolantonio | 285/155 |
| 4,473,035 | 9/1984 | Gorzegno | 285/155 |

FOREIGN PATENT DOCUMENTS

| | | | |
|---|---|---|---|
| 161110 | 2/1955 | Australia . | |
| 207138 | 3/1957 | Australia . | |
| 273421 | 5/1965 | Australia | 285/155 |
| 428132 | 9/1972 | Australia . | |
| 431813 | 1/1973 | Australia . | |
| 440860 | 9/1973 | Australia . | |
| 512219 | 10/1980 | Australia . | |
| 177031 | 12/1953 | Austria | 285/155 |
| 259957 | 2/1968 | Austria | 285/155 |
| 276883 | 12/1969 | Austria | 285/155 |
| 829837 | 7/1949 | Fed. Rep. of Germany . | |
| 869716 | 3/1953 | Fed. Rep. of Germany | 285/155 |
| 1026242 | 7/1956 | Fed. Rep. of Germany . | |
| 1525914 | 7/1969 | Fed. Rep. of Germany | 285/155 |
| 1525608 | 11/1969 | Fed. Rep. of Germany . | |
| 1801101 | 6/1970 | Fed. Rep. of Germany . | |
| 73746 | 9/1960 | France . | |
| 2135882 | 12/1972 | France . | |
| 2137355 | 12/1972 | France . | |
| 156221 | 12/1979 | Japan | 285/155 |
| 81309 | 4/1956 | Netherlands | 285/155 |
| 104438 | 8/1964 | Norway | 285/155 |
| 131476 | 6/1975 | Norway . | |
| 143234 | 1/1981 | Norway . | |
| 291591 | 9/1953 | Switzerland | 285/155 |
| 350511 | 1/1961 | Switzerland . | |
| 430350 | 8/1967 | Switzerland | 285/155 |
| 468588 | 5/1969 | Switzerland | 285/155 |
| 332758 | 8/1929 | United Kingdom . | |
| 449832 | 7/1936 | United Kingdom . | |
| 4514460 | 8/1936 | United Kingdom . | |
| 519027 | 3/1940 | United Kingdom . | |
| 699283 | 11/1953 | United Kingdom | 285/155 |
| 1451869 | 10/1976 | United Kingdom . | |

Primary Examiner—Gary L. Smith
Assistant Examiner—Eric K. Nicholson
Attorney, Agent, or Firm—Lucas & Just

[57] ABSTRACT

A device for joining of pipelines for transportation of fluids allowing pigs to pass the coupling undisturbed. The diameter of the conduit in the middle portion (II) of the coupling is larger than the nominal internal diameter of the pipelines.

7 Claims, 1 Drawing Sheet

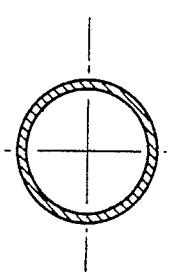
FIG. 3B.
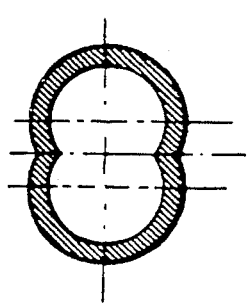
FIG. 3C.
FIG. 3A.
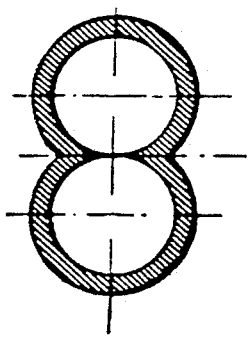
FIG. 3D.
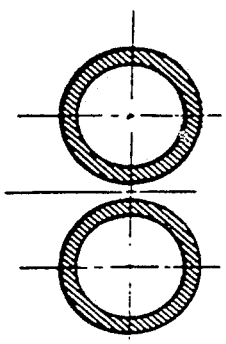
FIG. 3E.
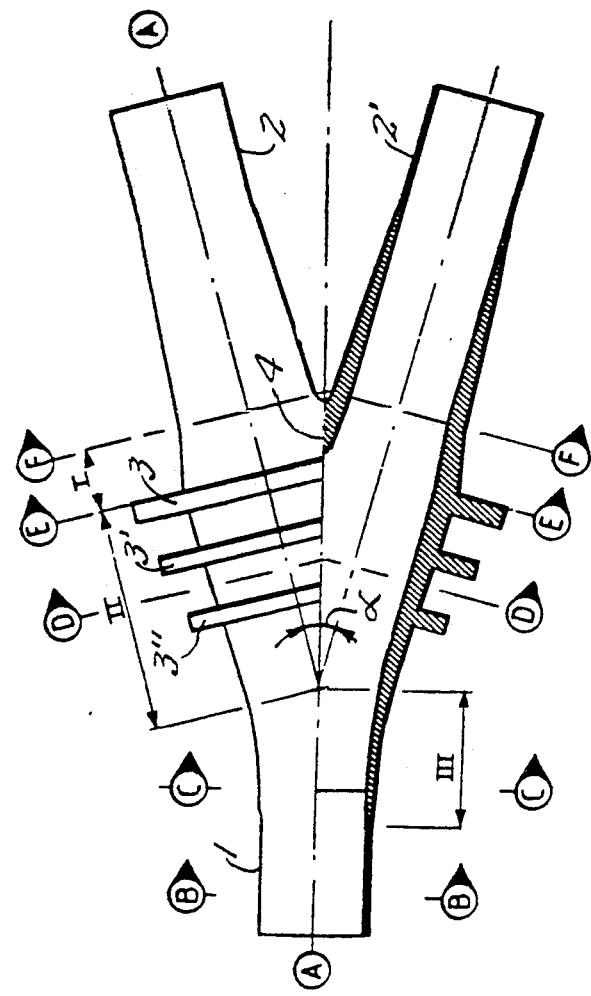
FIG. 1.
FIG. 1A.
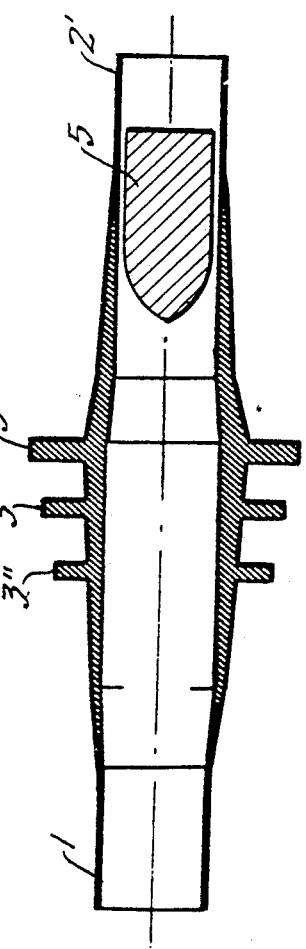
FIG. 2.

DEVICE FOR JOINING OF PIPELINES

This is a continuation of application Ser. No. 865,058, filed May 20, 1986, now abandoned.

This invention relates to a device for facilitating the joining of pipelines, in particular pipelines for transport of hydrocarbons.

To achieve safe and effective operation of oil- and gas-transporting pipelines, it is common to make use of so-called pigs, which are devices that are guided through the pipelines and which have various functions, all according to their intended tasks. Pigs are employed for separation of different media, cleansing, repairs, and during the operation of the pipeline system, for removal of water, condensate, and wax and for chemical treatment and inspection.

The employment of pigs in pipelines is however regarded as somewhat hazardous operation both in regard to disturbances and the total safety of the operation of the pipeline. Components which may make the pigging operations more complicated are therefore avoided if possible, and as a rule pipelines intended for pigging are not joined together directly.

Conventionally therefore the joining of pipelines of the above mentioned kind is carried out by bringing together each separated branch at a site where admission to the connection point is possible. This will enable each branch to be pigged separately. This way of coupling however, requires that extra equipment, for instance pig traps have to be installed at or near by the connection point. For pipeline systems being laid offshore this means that for instance the joining of two pipelines normally will have to take place on a platform and therefore this means a complicated and expensive solution if the conditions for a direct connection of the pipelines at the seabed otherwise is feasable.

According to the present invention a device is provided which significantly simplifies the joining of transport pipelines. The device according to the invention, and preferred embodiments thereof are stated in the claims.

The invention will be further illustrated by reference to the adjoining drawings, where FIG. 1 shows an outline of the device partly in cross section, FIG. 2 shows the device in cross section along the line A—A in FIG. 1, FIG. 3 shows the device in various cross sections along the longitudinal axis of the conduits.

The device incorporates two branch conduits (2 and 2'), a main conduit (1) and in between a zone in which the branch conduits are combined. The branch conduits (2 and 2') and the main conduit (1) are attached to their respective pipelines by any conventional technique.

The opening angle ($\alpha$) between the centerlines of the branch conduits is in the interval 20–60°, typically between 30° and 40°. A very essential feature of the coupling according to the invention is comprised by the conduits (1,2 and 2') in the middle region (II) of the coupling being expanded relative to the nominal pipeline diameter, i.e. that for instance the internal diameter of the conduit at D is larger than at B and F (see FIG. 1). Preferably the transition between nominal inner pipeline diameter and the diameter of the intersection region (II) of the coupling is made gradual in zones (I and III) on each side of the middle part of the coupling.

Preferably also the branch conduits (2 and 2') expand (increase in diameter) before the branch conduits meet, i.e. to the right of the section E-E in FIG. 1. By designing the coupling in this way one achieves that the restraining forces of the driving seals, brushes etc. are released symmetrically whereby the pigs will not receive any net impulse which will displace it out of course and in the direction of the other branch. The load on the pipe and the pig, together with the risk of the pig getting stuck in the coupling is thereby significantly reduced.

In FIG. 1, there is shown an outline of a pig 5 in the inlet tube 2'.

The internal diameter of the middle part (II) of the coupling is in general kept constant. Further it is preferred that the contraction (reduction in diameter) of the conduit takes place after the branch conduits (2 and 2') are united into one conduit, i.e. to the left of the point where the axis of the branch conduits (2 and 2') cross in FIG. 1. Thereby one achieves a substansional reduction of the pressure shocks which otherwise would have been generated by the acceleration of the pigs from one velocity when leaving one of the branch conduits to a new velocity after having entered the main conduit.

The internal diameter of the middle part (II) of the coupling is normally somewhat larger than the largest diameter of the seals or spring loaded parts of the pigs, typically 5–10% of nominal internal diameter. The increasing diameter in the region (I) in the branch conduit (2 and 2') does not prevent the pigs from being carried through the coupling by the fluid flow, as long as the velocity of the fluid is above a certain minimum.

In a preferred embodiment of the invention the coupling is provided with stiffeners (3,3' and 3"). Preferably these are located radially relative to the axis of the branch conduits (2 and 2') at the middle part (II) of the coupling. It is further preferred that one of the ribs (3) is located in the vicinity of the junction area (4) of the branch conduit (2 and 2').

It has been found that if the internal surfaces of the junction region (4) is machined in a way which makes the surface at the apex at the intersection of the branch conduits having a radius of minimum 2-10 % of nominal internal pipe diameter, local overstressing of this part of the construction can be reduced.

The device according to the invention may be employed for the connection of pipelines where the diameter of the pipelines are the same, or may differ. In practice the pigs which are to be carried through the pipeline system set the limit for joining pipelines of internal diameter of to great variations.

Further it is to be understood that the branch conduits and main conduit not necessarily will have to be orientated symmetrically in relation to each other, but may be arranged in various ways both within and outside the plane.

The device according to the invention can be manufactured by conventional casting- and forging processes and the choice of material will in each instance be decided upon in respect of the medium which will be transported through the pipeline system and the requirements of the external environments of structures of this kind.

We claim:

1. In a pipeline used for transporting oil and gas undersea, said pipeline having a Y-connector for joining two branch pipelines (2, 2') to a main pipeline (1) where said main pipeline and said two branched pipelines have similar internal diameter, the improvement in said Y-connector comprising:

(a) a main pipeline connector (III) having a hollow internal area similar in shape to a truncated cone, said main pipeline connector having an inlet corresponding to the base of said cone and an outlet corresponding to the top of said cone;

(b) two branch-pipeline-connectors, each one having an inlet and an outlet, and each one having an internal diameter increasing in size from the inlet to the outlet; and (c) a middle section (II) having an inlet joined to the outlet of each of said two branch-pipeline-connectors and an outlet joined to the inlet of said main pipeline connector, said middle section having two branch-pipeline conduits merge together, the branch-pipeline conduits having circular cross sections which increasingly overlap each other in a central portion between said two branch-pipeline conduits as said two branch-pipeline conduits merge towards the outlet of said middle section, whereby part-circular envelopes remaining outside the overlapped portion of the circular cross-sections always are greater than 180° thereby forming a pair of ridges through said middle section, and whereby the diameters of the overlapping cross sections are greater than the internal diameters of the branch-pipelines and the main pipeline, said Y-connector allowing a pig to pass from either one of said two branch pipelines to said main pipeline thereby following the flow of fluid in said pipeline.

2. The Y-connector of claim 1 wherein the two branch-pipeline-conduit axes form an angle between each other equal to about 20° to about 60°.

3. The Y-connector of claim 1 wherein the two branch-pipeline-conduit axes form an angle between each other equal to about 30° to about 40°.

4. The Y-connector of claim 1 further comprising stiffener ribs positioned on said middle section (II).

5. The Y-connector of claim 1 wherein said two branch-pipeline-connectors form a tongue wherein said two branch-pipeline-connectors are joined to one another at the inlet of said middle section, said tongue having a radius of curvature at least about 2 to about 10% of the internal diameter of said two branch pipelines.

6. The Y-connector of claim 1 wherein the diameter of the two branch pipeline conduits in the middle section is about 5 to about 10% greater than the internal diameter of said main pipeline.

7. The Y-connector of claim 1 wherein the axes of the branch-pipeline conduits, the merging branch-pipeline conduits of the middle section (II), and the main-pipeline conduit all lie in the substantially same plane.

* * * * *

UNITED STATES PATENT AND TRADEMARK OFFICE
CERTIFICATE OF CORRECTION

PATENT NO. : 4,971,307

DATED : November 20, 1990

INVENTOR(S) : Kai Killerud et al.

It is certified that error appears in the above-identified patent and that said Letters Patent is hereby corrected as shown below:

Column 1, line 47, after "section," insert
--Fig. 1A is an enlarged section of the junction region of the device of the present invention,--

Column 1, line 51, after "conduits" insert:
--; Fig. 3A is taken at section B-B of Fig. 1, Fig. 3B is taken at C-C of Fig. 1, Fig. 3C is taken at D-D of Fig. 1, Fig. 3D is taken at E-E of Fig. 1, and Fig. 3E is taken at F-F of Fig. 1--

Column 2, line 12, change "FIG. 1" to --FIG. 2--

Column 2, line 45, after "reduced" insert --, see Fig. 1A--.

Signed and Sealed this

Eighteenth Day of August, 1992

Attest:

DOUGLAS B. COMER

*Attesting Officer*  *Acting Commissioner of Patents and Trademarks*